US008102543B2

(12) United States Patent
Tomomatsu

(10) Patent No.: US 8,102,543 B2
(45) Date of Patent: Jan. 24, 2012

(54) INFORMATION PROCESSING APPARATUS, INFORMATION PROCESSING METHOD AND PRINTING CONTROL PROGRAM

(75) Inventor: Yoshiaki Tomomatsu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1396 days.

(21) Appl. No.: 10/654,029

(22) Filed: Sep. 4, 2003

(65) Prior Publication Data

US 2004/0105102 A1 Jun. 3, 2004

(30) Foreign Application Priority Data

Sep. 6, 2002 (JP) .................................. 2002-261979
Jul. 15, 2003 (JP) .................................. 2003-197271

(51) Int. Cl.
*G06F 15/00* (2006.01)

(52) U.S. Cl. ......................... 358/1.1; 358/1.13; 358/1.17

(58) Field of Classification Search ................ 358/1.13, 358/1.1, 3–3.25, 3.26–3.27, 3.28, 3.29–3.32; 382/162–167
See application file for complete search history.

(56) References Cited

U.S. PATENT DOCUMENTS

| 5,745,659 A * | 4/1998 | Rigau et al. ..................... 358/1.2 |
| 6,549,301 B1 * | 4/2003 | Yasukawa ....................... 358/1.2 |
| 7,315,386 B1 * | 1/2008 | Shiimori et al. ............. 358/1.15 |
| 2002/0054312 A1 * | 5/2002 | Tomita ......................... 358/1.13 |
| 2002/0063878 A1 * | 5/2002 | Nakagiri ....................... 358/1.13 |
| 2002/0135808 A1 * | 9/2002 | Parry ............................ 358/1.17 |
| 2003/0103227 A1 | 6/2003 | Tomomatsu ................. 358/1.13 |

FOREIGN PATENT DOCUMENTS

| JP | 09-076555 A | 3/1997 |
| JP | 09-156158 A | 6/1997 |
| JP | 2000-108459 A | 4/2000 |
| JP | 2000-255120 A | 9/2000 |
| JP | 2001-195213 | 7/2001 |
| JP | 2001195213 | * 7/2001 |
| JP | 2002-190950 A | 7/2002 |
| JP | 2003-167701 | 6/2003 |

OTHER PUBLICATIONS

Office Action, dated May 2, 2008, in JP 2003-197271.
Japanese Office Action dated Apr. 16, 2010 concerning Japanese patent Application No. 2008-167849.
Japanese Office Action dated Jul. 20, 2010 concerning the Japanese Patent Application No. 2010-136643.
Japanese Office Action dated Nov. 12, 2010 concerning JP 2010-136643.

* cited by examiner

*Primary Examiner* — King Poon
*Assistant Examiner* — Iriana Cruz
(74) *Attorney, Agent, or Firm* — Fitzpatrick, Cella, Harper & Scinto

(57) ABSTRACT

When draw data that has been created by an application program is spooled, whether the resolution of the draw data is to be lowered is decided. If it is decided that the resolution of the draw data is to be lowered, printer information in which the resolution of print data to be spooled has been lowered is returned and spooling is performed at the lowered resolution. The draw data thus spooled is rasterized into a raster image at a resolution that conforms to the resolution of an image forming device, and the raster image that has been rasterized is output to a printer to thereby form an image.

12 Claims, 20 Drawing Sheets

FIG. 2

|  | 600dpi | 720dpi | 1200dpi |
|---|---|---|---|
| A4 | 93.8 | 135.0 | 187.6 |
| B4 | 142.2 | 204.8 | 284.4 |
| A3 | 190.9 | 274.2 | 381.7 |

(Mega Bytes / Page)

FIG. 3

| | |
|---|---|
| ulVersion | VERSION OF DEVICE DRIVER |
| ⋮ | ⋮ |
| ulHorzSize | PHYSICAL WIDTH OF SCREEN IN MILLIMETERS (mm) |
| ulVertSize | PHYSICAL HEIGHT OF SCREEN IN MILLIMETERS (mm) |
| ulHorzRes | WIDTH OF PRINTING AREA IN PIXELS UNITS ~ 303 |
| ulVertRes | HEIGHT OF PRINTING AREA IN PIXELS UNITS ~ 304 |
| ⋮ | ⋮ |
| ulLogPixelsX | NUMBER OF PIXELS PER LOGICAL INCH IN HORIZONTAL DIRECTION OF SCREEN ~ 301 |
| ulLogPixelsY | NUMBER OF PIXELS PER LOGICAL INCH IN VERTICAL DIRECTION OF SCREEN ~ 302 |
| ⋮ | ⋮ |
| ptlPhysOffset.x | REPRESENTS DISTANCE FROM LEFT END OF PHYSICAL PAGE TO LEFT END OF PRINTABLE AREA IN DEVICE UNITS ~ 305 |
| ptlPhysOffset.y | REPRESENTS DISTANCE FROM UPPER END OF PHYSICAL PAGE TO UPPER END OF PRINTABLE AREA IN DEVICE UNITS ~ 306 |
| szlPhysSize.x | REPRESENTS PHYSICAL WIDTH OF PAGE IN DEVICE UNITS |
| szlPhysSize.y | REPRESENTS PHYSICAL HEIGHT OF PAGE IN DEVICE UNITS |
| ⋮ | ⋮ |

FIG. 4

| | |
|---|---|
| dmDeviceName | DEVICE NAME |
| dmSpecVersion | VERSION NUMBER OF INITIALIZED DATA SPECS |
| dmDriverVersion | VERSION NUMBER OF DRIVER        402 |
| dmSize | BYTE LENGTH OF DEVMODE DATA EXCLUDING dmDriver Data MEMBER |
| dmDriverExtra | BYTE LENGTH OF PRIVATE DRIVER DATA THAT FOLLOWS THIS DATA |
| dmFields | DESIGNATES MEMBER THAT HAS BEEN INITIALIZED BY MEMBER |
| dmOrientation | PAPER ORIENTATION |
| dmPaperSize | SIZE OF PAPER PRINTED ON |
| dmPaperLength | PAPER LENGTH (1/10 mm UNITS) |
| dmPaperWidth | PAPER WIDTH (1/10 mm UNITS) |
| ⋮ | ⋮ |
| dmPrintQuality | PRINTER RESOLUTION ～ 403 |
| dmColor | SETS COLOR AND MONOCHROME AT COLOR PRINTER |
| ⋮ | ⋮ |
| dmDriverData | DEVICE-SPECIFIC INFORMATION ～ 401 |

*NUMBERS IN PARENTHESES INDICATE PIXEL NUMBERS AFTER CHANGING OF RESOLUTION

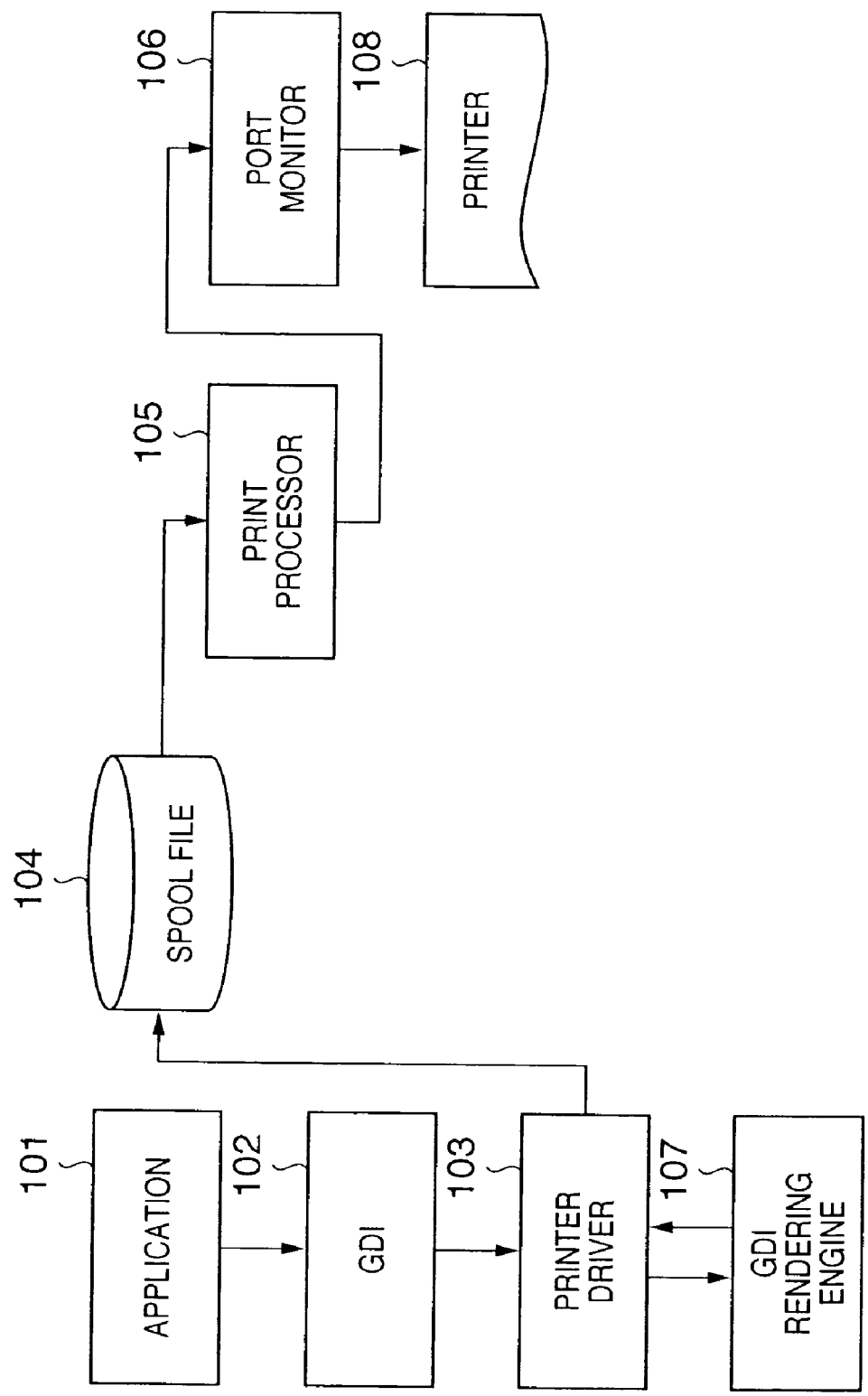

FIG. 14
| Page 1 | | | | |
|---|---|---|---|---|
| 4 | 9 | 3 | 7 | 8 |
| 6 | 7 | 4 | 6 | 7 |
| 4 | 3 | 2 | 2 | 6 |
| 4 | 1 | 8 | 2 | 2 |
| 6 | 3 | 6 | 4 | 2 |
| 4 | 3 | 8 | 8 | 4 |
| 4 | 9 | 8 | 2 | 8 |
| 6 | 7 | 4 | 6 | 2 |
Page 2
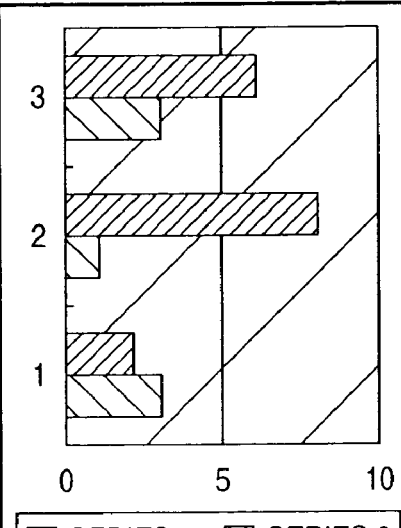
Page 3
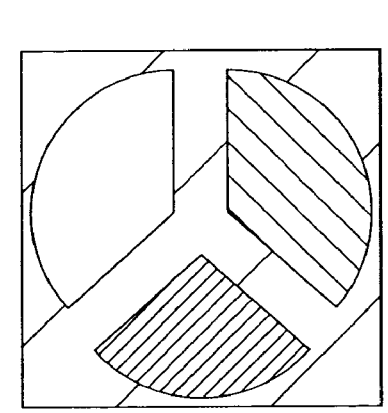
Page 4
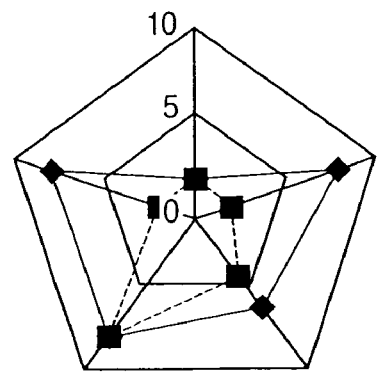

FIG. 15
| Page 1 | | | | |
|---|---|---|---|---|
| 4 | 9 | 3 | 7 | 8 |
| 6 | 7 | 4 | 6 | 7 |
| 4 | 3 | 2 | 2 | 6 |
| 4 | 1 | 8 | 2 | 2 |
| 6 | 3 | 6 | 4 | 2 |
| 4 | 3 | 8 | 8 | 4 |
| 4 | 9 | 8 | 2 | 8 |
| 6 | 7 | 4 | 6 | 2 |
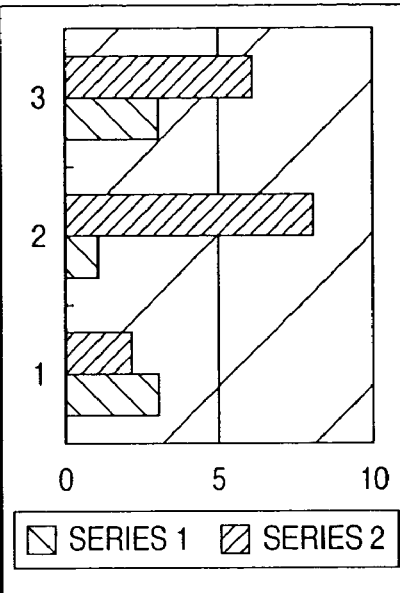
Page 2
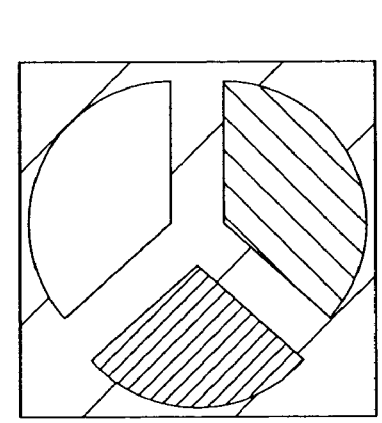
Page 3
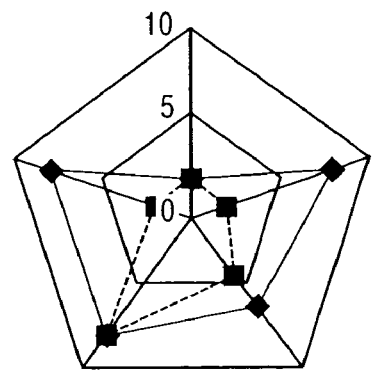
Page 4

INFORMATION PROCESSING APPARATUS, INFORMATION PROCESSING METHOD AND PRINTING CONTROL PROGRAM

FIELD OF THE INVENTION

This invention relates to an information processing apparatus, information processing method and printing control program for generating data, which is to be formed by an image forming device, based upon draw data that includes characters and graphics, etc.

BACKGROUND OF THE INVENTION

A printing system that performs printing by a printer based upon a raster image sent from a host computer is known in the art. Such a printer is referred to as a "host-based printer". When a raster image in print data transmitted to the host-based printer is rasterized, draw data such as text, graphics and photographs created by an application program (referred to simply as an "application" below) running on the host computer is spooled temporarily in a virtual page memory of the host computer as a spool file (EMF data) via a rendering module [referred to as a "GDI" (Graphic Device Interface) in Microsoft's Windows (registered trademark) operating system] of the operating system, after which the spool file is read out and rasterized by a printer driver or by the rendering module of the operating system.

There is such a system (see the specification of Japanese Patent Application Laid-Open No. 2003-167701) in which draw data from within an application is spooled in a spool file of an operating system and the file is read out by a print processor and rasterized by a printer driver or by a rendering module of the operating system.

When data is rasterized into such raster-image data and the data is text data, the application outputs not only the style of a character and the character code but also coordinate information indicating the position of the character. If the data is graphic data, then the application outputs the category, such as the shape, the color and coordinate information. In the case of an image such as a photograph, the application outputs the sizes of original image and of the output destination.

The greater functionality of recent applications is accompanied by greater complexity of the data generated by the applications. Accordingly, depending upon the printer and the functions of the printer driver, there are cases where data that has been accepted from the application cannot be analyzed and rasterized to image data correctly. As a consequence, when some applications output text data and graphic data created thereby to a printer, there are instances where the data is printed after being rasterized by the application into image data conforming to the rendering resolution of the printer. If data that has been rasterized into an image is spooled using an application of this kind, the size of the spool data becomes very large and a problem which arises is that the computer hard disk and memory are put under pressure.

A similar problem is conceivable even if the application is not one that rasterizes images. With the popularization of high-resolution digital cameras in recent years, it has become possible to deal with high-resolution image data in host computers. If high-resolution image data is printed upon being pasted to the page of a document, there are instances where, depending upon the application, the original image data is output as is without being made to conform to the number of pixels of the area pasted. If the output data is spooled using such an application, the size of the spool data becomes very large and therefore the computer hard disk and memory are put under pressure. Specifically, depending upon the operating system, there are cases where a print error occurs if the size of the spool data exceeds 4 GB (gigabytes), because output size supported on the application side is exceeded, or because the hard disk does not have enough available storage capacity.

In particular, owing to the ever higher rendering resolution that accompanies improvements in printer image quality achieved in recent years, the size of spool data increases, errors occur in the application or within the spooler and data cannot be rasterized into an image normally. As a result, rendering resolution cannot be raised. This is an impediment as far an improving the image quality of a printer is concerned.

SUMMARY OF THE INVENTION

Accordingly, a feature of the present invention is to provide an information processing apparatus, information processing method and printing control program through which the size of a spool file for outputting raster image data to an image forming device can be reduced and a high-quality image formed.

A feature of the present invention is to provide an information processing apparatus in which draw data created by an application program is spooled by an operating system, the apparatus having a printer driver for accepting draw data from the operating system based upon the draw data that has been spooled, said apparatus comprising: determination means for determining whether or not to execute a reducing mode, which is for reducing spool size in spool processing executed by the operating system; first command means which, when the determination means has determined that the reducing mode is to be executed, issues a command that spooling be performed by the operating system upon reducing output size of the draw data created by the application program; and image formation job generating means for generating an image formation job, which includes a raster image that has been rasterized at an output size conforming to image forming processing by an image forming device, based upon the draw data that has been spooled.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 depicts a diagram showing an example of the sizes of spool files per page for various paper sizes and rendering resolutions;

FIG. 3 depicts a diagram illustrating part of the data structure of GDIINFO;

FIG. 4 depicts a diagram illustrating part of the data structure of DEVMODE;

FIG. 9 is a block diagram illustrating the configuration of a printing system according to a second embodiment of the present invention;

FIG. 14 depicts a diagram illustrating an example of 4-up printing in which four pages of data have been printed in a 2×2 layout on a single sheet of paper;

FIG. 15 depicts a diagram illustrating an example in which some fine lines have not been printed in N-up printing;

DESCRIPTION OF THE PREFERRED EMBODIMENTS

Preferred embodiments of the present invention will now be described in detail with reference to the accompanying drawings.

Figure 1:
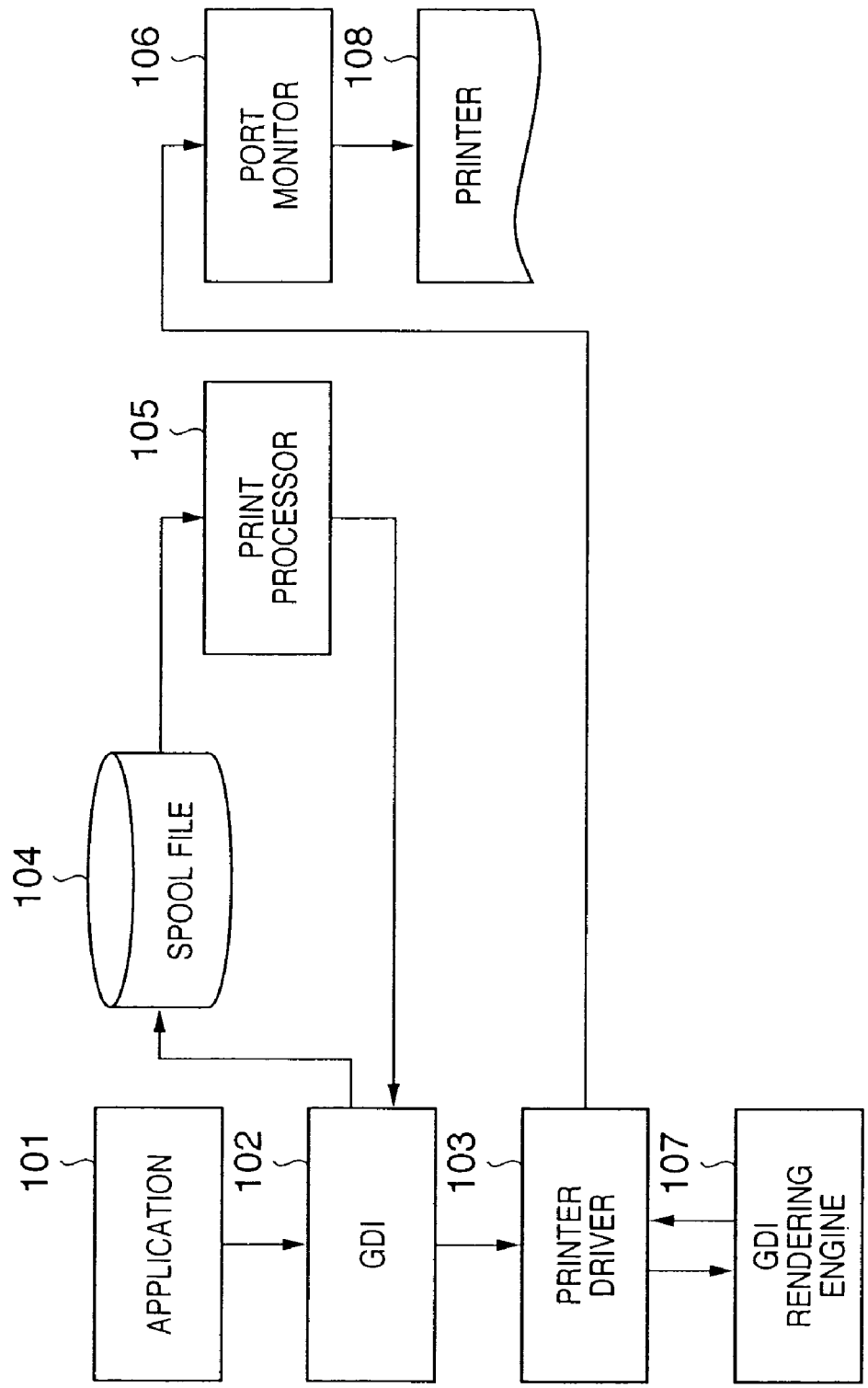
FIG. 1 is a block diagram illustrating the configuration of a printing system according to a first embodiment of the present invention.

FIG. 1 is a block diagram illustrating the configuration of a printing system according to a first embodiment of the present invention. Here the embodiment shown in FIG. 1 is considered to be of a form in which the Microsoft operating system Windows (registered trademark) is used as the operating system in a generally available personal computer (which corresponds to the information processing apparatus of the present invention), any application 101 having a print processing function has been installed in the computer, and a printer 108 has been connected to the computer.

Draw data (print data such as document data and image data) that the application 101 has requested be printed is delivered to a printer driver 103 via a Graphic Device Interface ("GDI" below) 102, which is a rendering module in the operating system. As a result, a print job is generated by the printer driver 103 and the generated print job is output to the printer 108 as a print request. The GDI 102 ordinarily spools this data temporarily (the spool processing is executed as part of the operating system) in a spool file 104 as EMF (Enhanced MetaFile) data. When spooling ends, the GDI 102 issues a print request to a print processor 105. As a result, the print processor 105 reads in print output information and draw data from the spool file 104 page by page, outputs this to the printer driver 103 one page at a time via the GDI 102 and requests that printing be performed. When the print processor 105 outputs the draw data that has been spooled in the spool file 104 to the printer driver 103, the print processor 105 functions to convert coordinate information in accordance with the resolution of the raster image data that is output from the printer driver 103. It should be noted that although the print processor 105 is provided as a module in the operating system, a print processor customized as by the printer manufacturer is allowed to be provided together with the printer driver 103 and these are allowed to be installed on a hard disk. The printer driver 103 thus requested by the print processor 105 to perform printing renders the draw data into raster image data in accordance with the printing resolution of the printer 108 using a GDI rendering engine 107, which is a rendering function implemented by the operating system, subsequently executes color processing and adds on printer commands, generates data in the form of a print job and transmits the print job to the printer 108 via a port monitor 106.

The spool file 104 created by this spool processing of the operating system retains the command by which the application 101 requests printing, or a bitmap image, etc., as a file. At this time, the usual practice is for character style, character-string character code and coordinate information, etc., to be retained in regard to characters. With regard to images such as photographs, usually the original image information and coordinate information is retained. After characters, graphics and image data are read in by the printer driver 103, rendering is performed by the GDI rendering engine 107 and a conversion is made to raster image data that conforms to the resolution of the printer 108. As a result, even if there is an increase in resolution that accompanies an increase in the image quality of the printer 108, the size of the spool file 104 does not increase and no problems arise. It should be noted that the GDI 102 and GDI rendering engine 107 have been described as being separate in order to facilitate the description. With Microsoft's Windows (registered trademark) operating system, however, both are implemented by the same rendering output module. Further, the printer driver 103 itself may be equipped with a rendering function. However, developing software on each occasion in such a manner that the rendering function of the printer driver 103 is supported in preparation for extension of a plotting and drawing function supported by the GDI 102 (107) would burden printer manufacturers. It is preferred, therefore, that rendering be carried out using the rendering function (GDI rendering engine 107) of the operating system.

In a case where the draw data is complicated data or the like, there are instances where printing cannot be performed normally, depending upon the functions of the printer 108 and printer driver 103. Depending upon the application 101, therefore, there are instances where rendering is carried out by the application 101 and the resulting raster image is output to the printer driver 103. In such cases, usually the entire image of the page is converted to a raster image and output from the application 101 at a resolution the same as that used when rendering processing is executed by the printer driver

103. A problem which arises is that the amount of spool data 104 itself becomes very large as the resolution of the raster image (the resolution of the printer 108) increases. Further, system error ascribable to an increase in spool data size occurs, as mentioned earlier, even with an application that does not execute rendering processing.

FIG. 2 is a diagram showing an example of sizes of the spool file 104 for a single page for various paper sizes to be printed and various rendering resolutions of the printer 108.

FIG. 2 depicts the capacity of one page's worth of the spool file 104. Data storage capacity for spool data at various resolutions (600, 720 and 1200 dpi) versus paper sizes of A4, B4 and A3 is expressed in megabyte units. Of course, if a plurality of pages have been spooled, the required storage capacity of the spool file 104 increases further. If the amount of spool data thus increases, not only does the time required for printing lengthen but spool error may also occur owing to insufficient storage capacity of the hard disk. Owing to a great increase in the raster data handled, memory error may occur within the application 101 or spooler and printing may not be performed normally.

Lowering rendering resolution, i.e., lowering the resolution of the raster image, also is conceivable as a method of dealing with the above situation. However, in case of an application that outputs characters or graphics as a draw command, rendering is performed at a low resolution even for character strings output by ordinary character code. This makes it impossible for the printer 108 to print at its original printing quality.

Accordingly, the object of this embodiment is to render, at high quality, draw data, which is output independently of resolution as in the manner of a character string output in accordance with a print character code, while reducing the size of the spool file 104 that is output from the application 101, which outputs raster image data that has been rendered at a resolution conforming to the rendering resolution, namely the resolution of the printer 108.

Processing according to the first embodiment will now be described in detail with reference to FIGS. 3 to 8.

Figure 5:
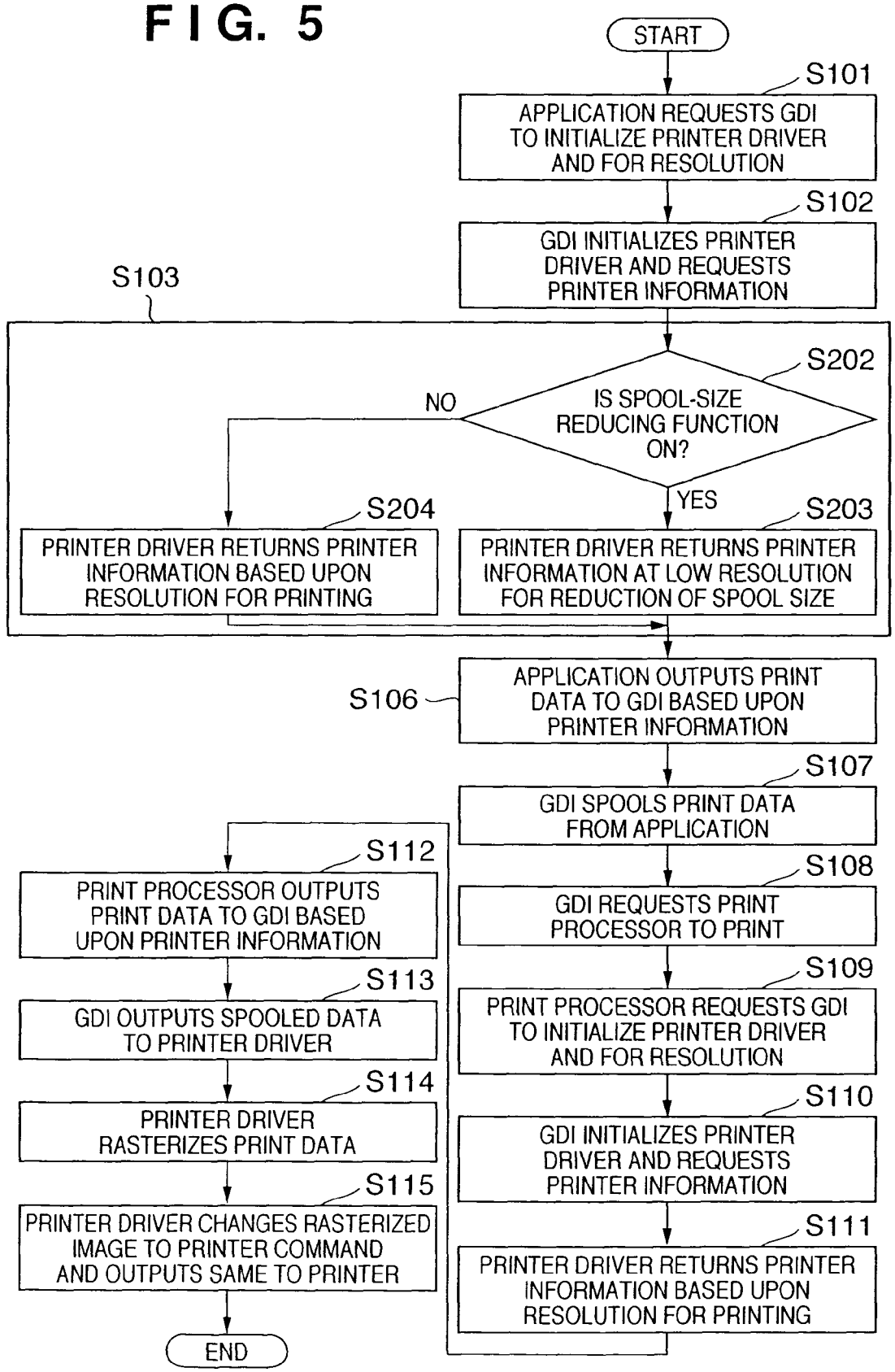
FIG. 5 is a flowchart illustrating an example of the flow of processing in the printing system according to the first embodiment.

FIG. 5 is a flowchart useful in describing an example of the flow of processing in the printing system according to the first embodiment. Here processing for spooling draw data created by the application 101 will be described.

First, draw data for printing (print data such as document data or image data) usually is created in accordance with the resolution or print area (number of pixels conforming to resolution) of the printer 108 of interest. At step S101 in FIG. 5, the application 101 requests the GDI 102 of the operating system to initialize the printer driver 103 and requests the GDI 102 for printer information such as the printing area and resolution of the printer 108 using a predetermined API (Application Programming Interface). Control then proceeds to step S102, at which the GDI 102 initializes the printer driver 103 in response to the request and requests the printer driver 103 for printer information referred to as "GDIINFO".

The "GDIINFO" has a data structure of the kind shown in FIG. 3.

First, the printer driver 103 sets paper size and a printing area within bounds of the paper based upon a user-set value referred to as "DEVMODE". For example, "ulLogPixelsX" 301 and "ulLogPixelsY" 302 are items of rendering resolution (numbers of pixels per logical inch in the horizontal and vertical directions, respectively, of the image). Examples of values set in accordance with this rendering resolution are "ulHorzRes" (printing width in pixel units) 303, "ulVertRes" (printing height in pixel units) 304, "ptlPhysOffset.x" (left-side offset of the printing area) 305, and "ptlPhysOffset.y" (upper-side offset of the printing area) 306.

FIG. 4 is a diagram illustrating an example of the user-set value "DEVMODE".

In the data structure of "DEVMODE", items other than "dmDriverData" (device-specific information) 401 have specifications common in the operating system. It is possible for "dmDriverData" 401 to be used freely on a per-printer-driver basis.

In order to reduce the size of the spool file 104 output from within the application 101 in regard to the raster image data that has been rendered at the above-mentioned rendering resolution, it will suffice to reduce the value of the rendering resolution. If the rendering resolution is reduced, however, printing quality will decline even with regard to draw data that is not dependent upon resolution as in the manner of a character string represented by a character code.

There are two cases in which the printer driver 103 is initialized. One is initialization carried out when the application 101 outputs draw data to the GDI 102. The other is initialization performed when the print processor 105 outputs data of the spool file 104 to the printer 108.

If the basis is the specifications of the operating system, then "ulLogPixelsX" 301 and "ulLogPixelsY" 302 set the rendering resolution. Here a conventional printer returns the same resolution for both types of initialization mentioned above. However, the printer driver 103 according to this embodiment returns a value of low resolution for the purpose of spool reduction only in the case where initialization is implemented from within the application. When initialization is from the print processor 105, the printer driver 103 returns a high rendering resolution (one which corresponds to the resolution of the printer 108). As a result, draw data that is output independently of resolution, such as a character string output in accordance with character code, can be printed at high quality while the size of the spool file 104 that outputs raster image data rendered at the rendering resolution is reduced in the application.

Accordingly, first it is required that the printer driver 103 determine whether it is necessary to return a resolution that is for the purpose of reducing spool size, i.e., to lower the resolution of the draw data to be spooled (step S103).

This determination processing will be described with reference to the flowchart of FIG. 6, in which steps identical with those in FIG. 5 are designated by like step numbers.

Figure 6:
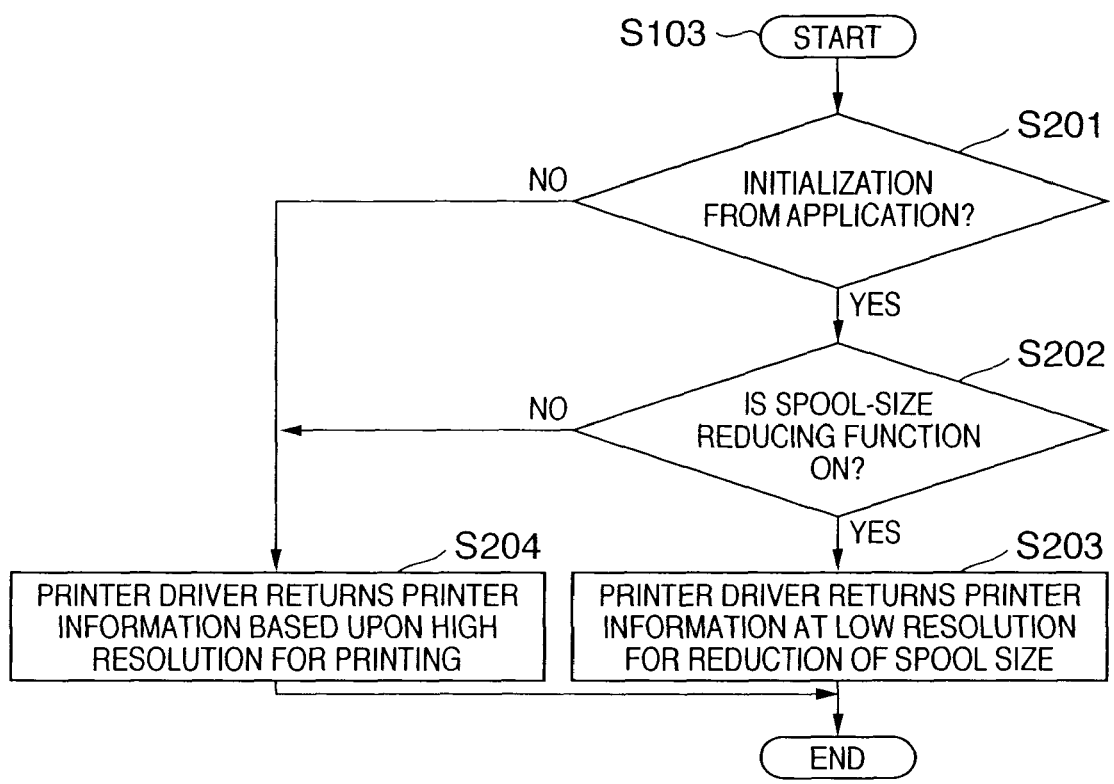
FIG. 6 is a flowchart useful in describing a determination made at a step S103 in FIG. 5 as well as processing that is based upon this determination.

FIG. 6 is a flowchart illustrating the processing of step S103 in FIG. 5 through which the printer driver 103 determines whether to turn on a spool-size reducing function and return a resolution that is in accordance with the determination made.

First, at step S201 in FIG. 6, the printer driver 103 determines whether initialization is from within the application 101 via the GDI 102 for spool-related purposes or is from the print processor 105 through the GDI 102 for the purpose of actual printing. As for one method of making this determination, it is possible to investigate the calling module. Accordingly, the determination can be made depending upon whether a code indicating the print processor 105 is within the calling module.

Another method is for dealing with a possible situation in which a customized print processor 105 is supplied together with the printer driver 103. This is for when use is made of a print processor other than one in line with the standard of the operating system. In this case, when the print processor 105 initializes the printer driver 103, a flag to the effect that initialization is from the print processor 105 is set in "DEV- MODE" beforehand and the printer driver 103 can determine from where initialization was designated by referring to this value.

If it is found at step S201 that initialization is from within the application 101, control proceeds to step S202. Here the printer driver 103 determines whether the function for reducing spool size is required. A method in which the user makes the selection is one example of a method of making this determination. Specifically, in cases where an error occurs during printing and printing halts as a result, the time required for printing becomes abnormally long or some or all of the draw data fails to be printed, the function for reducing spool size is turned on by a user decision employing a user-set function of the printer driver 103.

Figure 12:
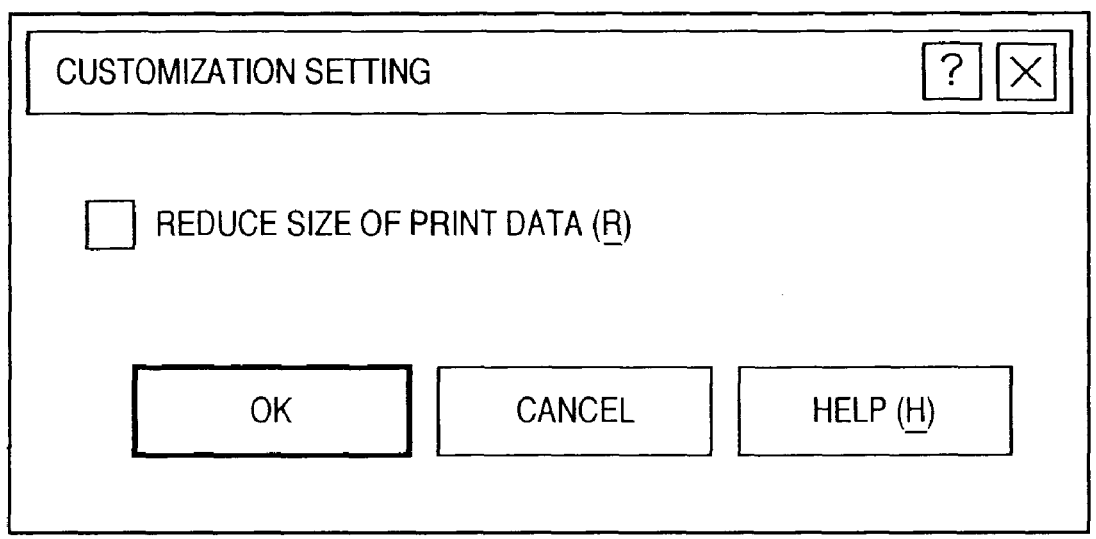
FIG. 12 depicts a diagram illustrating an example of a user interface screen provided by a printer driver for setting a spool-size reducing function.

FIG. 12 is a diagram illustrating an example of a user interface screen provided by the printer driver 103 for setting the spool-size reducing function.

This user interface screen is displayed by opening the properties of detailed printer setting of the printer driver 103 and designating a customization setting button (not shown). When the user commands the start of printing, the user calls the print details screen of the printer driver 103 from the print setting screen of the application 101, thereby causing the customization setting screen to be displayed. This allows the user to set the spool-size reducing function. Specifically, in the example of FIG. 12, the spool-size reducing function is set by checking a check box labeled "REDUCE SIZE OF PRINT DATA". The printer driver 103 stores information as to whether the spool-size reducing function is to be executed or not in "dmDriverData" 401 (see FIG. 4) of "DEVMODE" beforehand. By referring to this information at the time of printing, the printer driver 103 can determine whether or not to reduce the spool size.

Another method is for the printer driver 103 to make the determination based upon whether the size of the spool file 104 per page is greater than a predetermined page size, this being premised on a case where an entire page is output as an image. According to this method, the determination is made based upon "dmSize" 402, which indicates the size of the paper in "DEVMODE", or "dmPrintQuality (printer resolution) 403, which indicates printing quality. Other possible methods include one in which the printer driver 103 allows the user to reduce spool size based upon the spool size, and one in which a setting function is provided for making the spool-size reducing processing always on or always off, and determining whether the spool-size reducing processing is to be executed or not based upon the set value and spool size.

Figure 13:
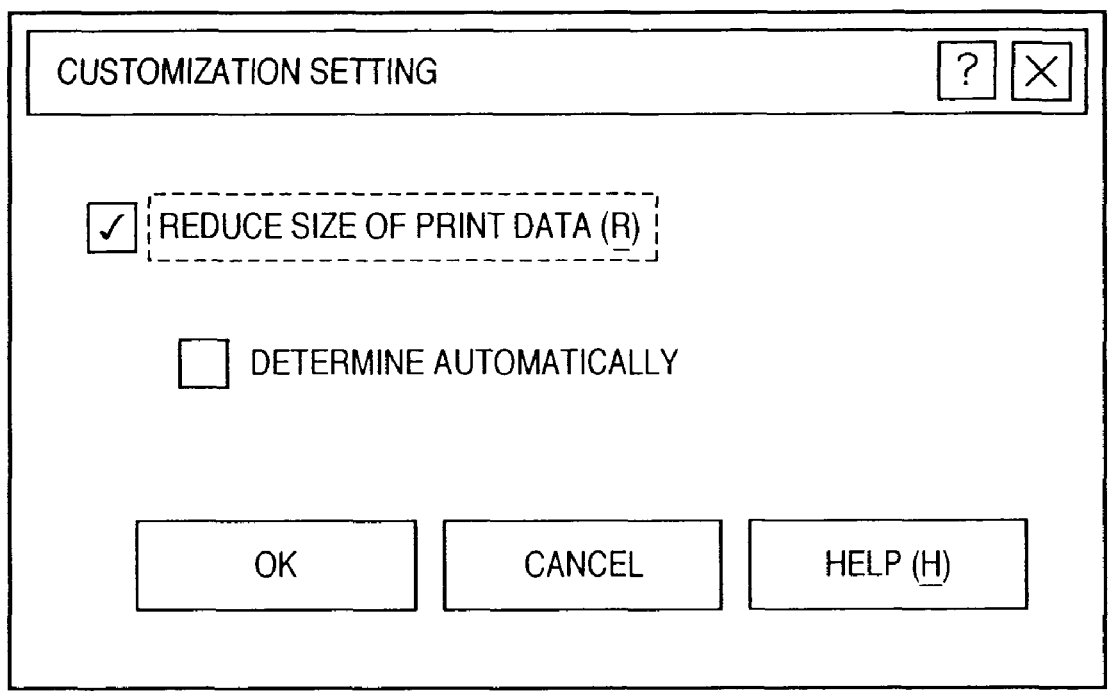
FIG. 13 depicts a diagram illustrating an example of a user interface screen, which is provided by a printer driver for the purpose of setting a spool-size reducing function, to which has been added a function that allows a determination to be made based upon spool size.

FIG. 13 depicts a diagram illustrating an example of a display screen that is the result of expanding the user interface screen of FIG. 12. This illustrates an example in which a function for making the above determination automatically is added on when making the setting of the spool-size reducing function. In this example, "DETERMINE AUTOMATICALLY" can be selected under conditions in which the "REDUCE SIZE OF PRINT DATA" check box has been checked. In a case where the "REDUCE SIZE OF PRINT DATA" check box has been checked (spool-size reducing processing has been selected) and, moreover, the "DETERMINE AUTOMATICALLY" check box has been checked, it is decided that spool-reducing processing is to be executed automatically based upon spool size.

With reference again to FIG. 6, control proceeds to step S204 if a "NO" decision is rendered at step S201 or S202 (meaning that no reduction in spool size is to be made). At step S204, the printer driver 103 returns printer information to the GDI 102 based upon a rendering resolution for printing purposes (i.e., based upon the resolution of printer 108).

On the other hand, if a "YES" decision is rendered at both steps S201 and S202 (meaning that spool size is to be reduced), control proceeds to step S203, where the printer driver 103 returns low-resolution printer information to the application 101 via the GDI 102 in order to reduce spool size.

According to this embodiment, it is assumed that the printing resolution of the printer is 600 dpi and that the resolution for when the spool-size reducing function is executed is 300 dpi. In the case of 300 dpi, the spool size that accompanies spool processing of the operating system will no longer exceed 1 GB, even if draw data is multivalued data, even if the application outputs draw data as a raster image. As a result, even if available capacity of the RAM area or HDD of the information processing apparatus is taken into consideration, it can be predicted that print processing generally cannot lead to spool processing error. Thus, the output data size of the spool file 104 from the application 101 that outputs an image that has been rendered at the above-mentioned rendering resolution can be reduced. However, in a case where the application 101 outputs an image that has been rendered at the rendering resolution, the result of rendering is output at the lowered resolution. Consequently, the lower the resolution is made, the smaller the spool size becomes and the result of printing deteriorates correspondingly. Accordingly, it is necessary to decide the resolution in dependence upon paper size and printing quality.

After step S203 or S204 is thus executed, control proceeds to step S106 (FIG. 5). Here the printer information that has been returned to the GDI 102 is returned to the application 101 via the GDI 102. As a result, on the basis of the printer information returned, the application 101 creates draw data based upon the obtained resolution or printing area and outputs the draw data to the GDI 102.

Next, control proceeds to step S107. Here the GDI 102 spools the draw data, which has been requested by the application 101, as the spool file 104 in accordance with the EMF format. This is the format of the standard spool file 104 according to the Windows (registered trademark) system. When spooling ends, control proceeds to step S108 (FIG. 5), at which the GDI 102 requests the print processor 105 to start printing.

Next, at step S109, the print processor 105 commanded at step S108 to start printing requests the GDI 102 to perform initialization in order to initialize the printer driver 103. Here, if initialization from the print processor 105 has been set in "DEVMODE" and this is found at the decision of step S201 in FIG. 6 described above, the print processor 105 sets information indicating that initialization is from the print processor 105 in "DEVMODE" at the time of initialization, requests the GDI 102 for initialization of the printer driver 103 and requests printer information such as the printing area or resolution of the printer 108. This is followed by step S110, at which the GDI 102 for which initialization of the printer driver 103 has been requested from the print processor 105 initializes the printer driver 103 and requests the printer driver 103 for "GDIINFO", which is printer information.

Control then proceeds to step S111, at which the printer driver 103 responds by setting "GDIINFO" and performing initialization. At this time the decision of step S201 is rendered in a manner similar to that at step S103 because an initialization function the same as that of step S103 is called. Here, since it is determined that initialization is not from within the application 101, the printer driver 103 sets the printer information in "GDIINFO" at the resolution for printing, which is the resolution of printer 108, and returns this printer information to the GDI 102.

Next, control proceeds to step S112, at which the print processor 105 outputs draw data to the GDI 102 on the basis of this printer information. At this time the GDI 102 is requested to effect a conversion to resolution (change the coordinate space) that is in accordance with the printer information obtained via the GDI 102. Control then proceeds to step S113, at which the GDI 102 reads out the draw data of the spool file 104 page by page and outputs it to the printer driver 103 in accordance with the command to convert resolution requested by the print processor 105. As a result, even if the resolution is different from that at the time of spooling, a resolution conversion is performed within the GDI 102 and then the printer driver 103 is requested to perform printing. This makes it possible to achieve printing in the same page layout.

Figure 7:
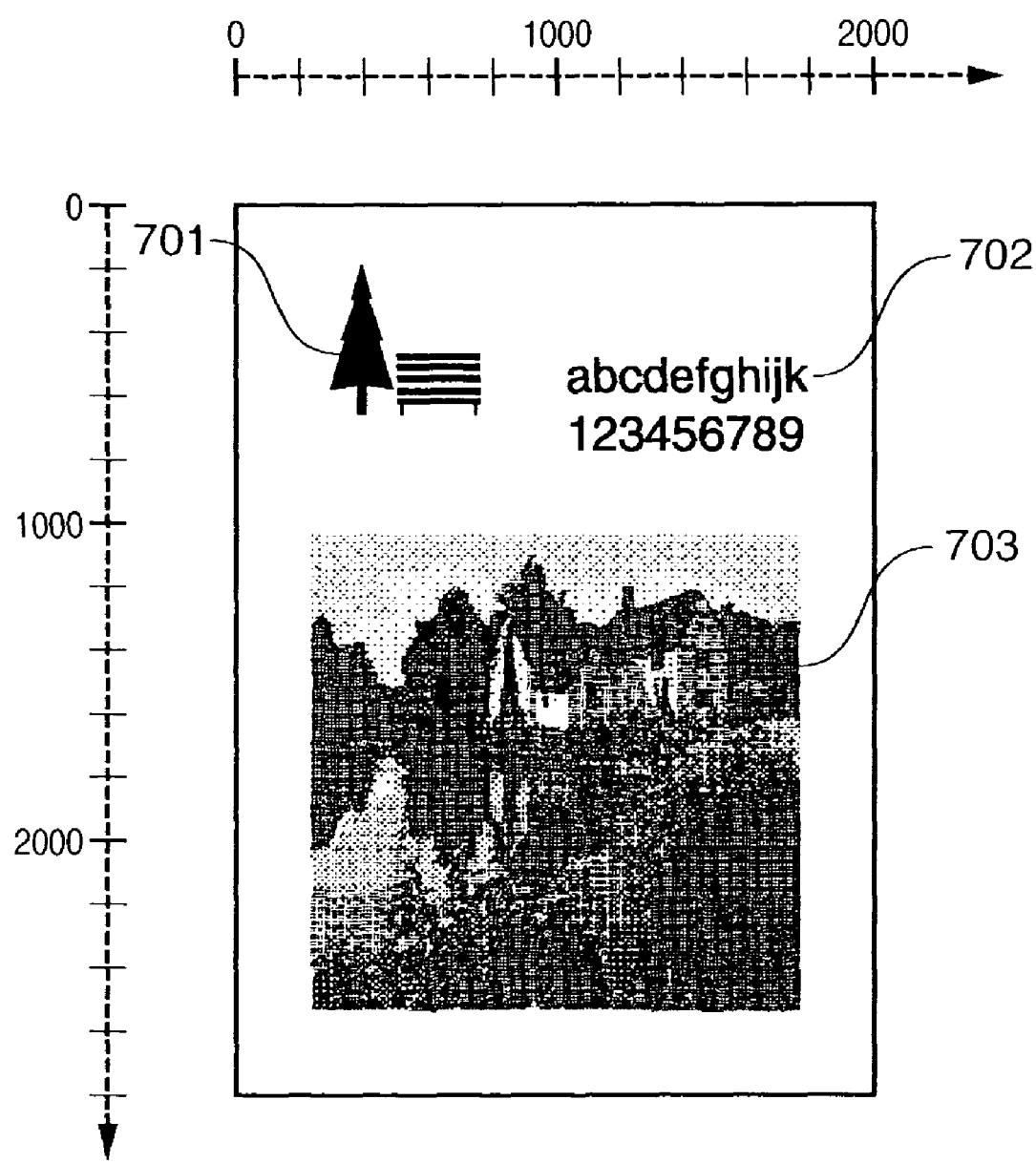
FIG. 7 depicts a diagram in which "an output command from an application" and "an output command from a GDI" in ordinary printing are described in simple terms.
Figure 8:
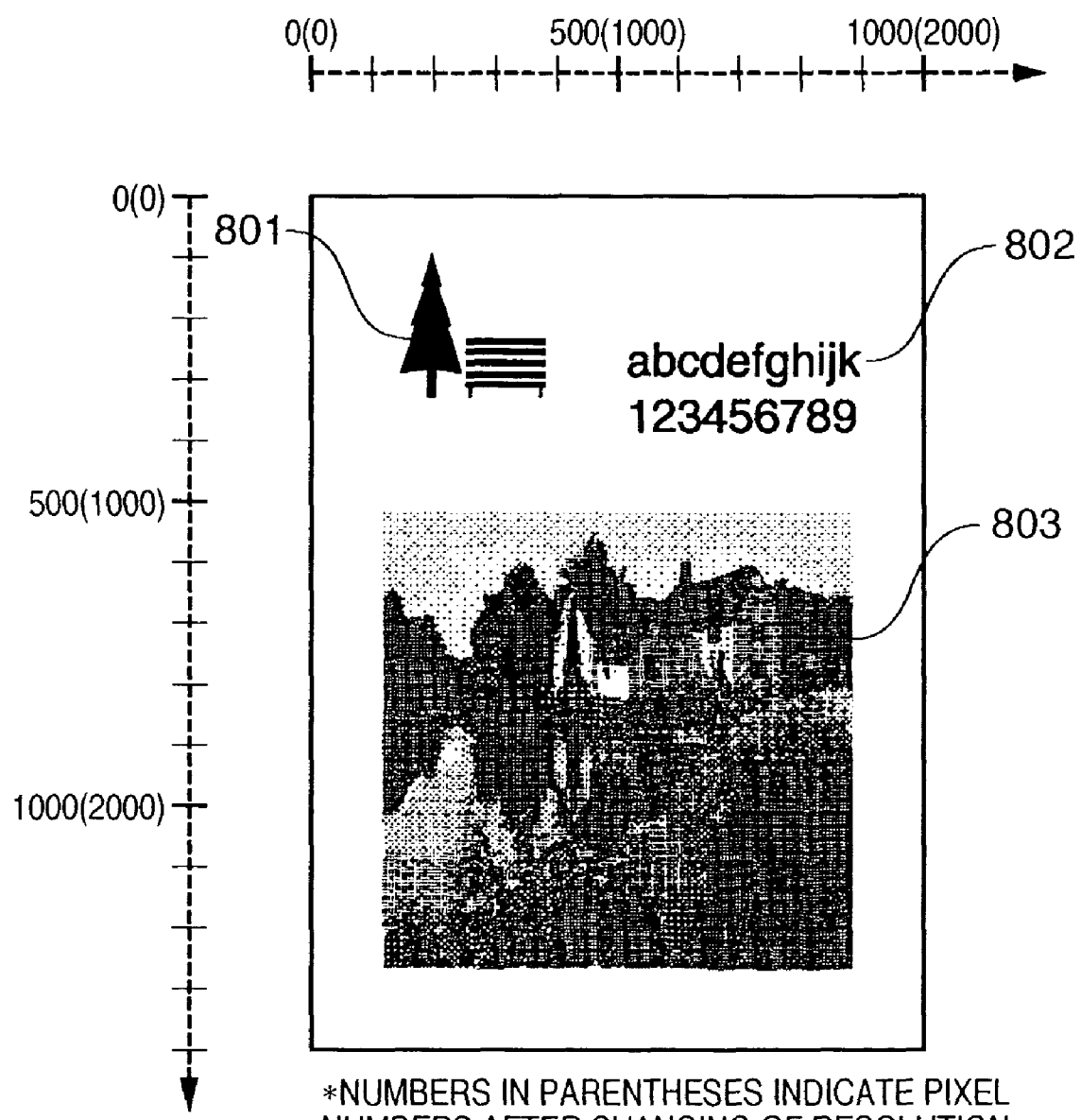
FIG. 8 depicts a diagram in which "an output command from an application" and "an output command from a GDI" in printing according to this embodiment are described in simple terms.

FIGS. 7 and 8 illustrate examples in which an output command from the application 101 to the GDI 102 and an output command from the GDI 102 to the printer driver 103 are described most simply.

FIG. 7 is a diagram illustrating an example of an output command based upon ordinary printing, and FIG. 8 is a diagram illustrating an example of a print command according to this embodiment.

In FIG. 7, a graphic image 701 is the result of printing an output from the application 101 in conformity with the rendering resolution of the printer driver 103. That is, the image 701 is an image of 600×600 pixels and has been output at 600×600 pixels with (200,200) as the starting point. Reference numeral 702 denotes the output area of a character string that has been output in accordance with character code. Here a character string "abcdefghijk" is output at position (1000, 400) at size 200, and a character string "123456789" is output at position (1000,600) at size 200. Reference numeral 703 denotes an enlarged output area of an original image that is not dependent upon the rendering resolution of the printer driver 103. The image 703 has been output upon enlarging a 100×100 image to a size of 1600×1600 from the starting point (200,1000). Actually, in case of an application in which output is by raster image data of the rendering resolution, an entire page is printed upon making a conversion to raster image data of the rendering resolution. In FIG. 7, however, the print image is set by draw data rather than raster image data. In the example of ordinary printing shown in FIG. 7, the output from the application 101 becomes the output from the GDI 102 as is. In the example of FIG. 7, therefore, the GDI 102 renders by outputting the sizes, display positions and display sizes of the images 701 to 703 as is. In other words, in the example of FIG. 7, "an output command from an application" and "an output command from a GDI" are in complete agreement.

FIG. 8 is a diagram illustrating result of printing based upon draw data identical with that of FIG. 7. However, the example of FIG. 8 is such that when there is an output from within the application 101, values in the vertical and horizontal directions that are each half of the rendering resolution for printing are returned as low resolution for the purpose of reducing spooling. This is specified in the form of a command indicated by "output command from application" shown in FIG. 8.

As will be evident from a comparison with FIG. 7, whereas an image of 600×600 pixels is spooled at reference numeral 701 in FIG. 7, an image of 300×300 pixels is spooled at reference numeral 801 in FIG. 8. The size of the spool data, therefore, is reduced. However, with regard to a character string 802 and image 803, which are not dependent upon rendering resolution, only the coordinate information and size differ; spooling is performed at the same data size. In other words, the size of the character string is "100", which is half the size "200" indicated at 702 in FIG. 7, and the coordinate information is (500,200), (500,300), which also is half of (1000,400), (1000,600), respectively. Further, in regard to the image indicated at 803, the starting point is (100,500), which is half the starting point (200,1000) of image 703 in FIG. 7, and the size is (800×800), which also is half of (1600×1600) of image 703 in FIG. 7.

With the above-mentioned "output command from application" (FIG. 8), the image 801 is an image of 300×300 pixels and has been output at a size of 300×300 pixels with (100, 100) as the starting point. The character string "abcdefghijk" is output at position (500,200) at size 100, and the character string "123456789" is output position at (500,300) at size 100. Furthermore, the image 803 has been output upon enlarging a 100×100 image to a size of 800×800 from the starting point (100,500).

In an "output command from GDI 102" (FIG. 8) described later, the size (resolution) of the image printed with regard to the graphic 801 is (300×300), which is ½×½ in comparison with graphic 701 in FIG. 7. Since this is a reduction in size (resolution), the image quality of the printout declines. However, as a result of the resolution conversion of GDI 102 as requested by the print processor 105, rendering is at a size of 600×600, and with regard to the character string 802 and image 803, output is by exactly the same command as that for the character string 702 and image 703. As a result, the character string 802 and image 803 are rendered at a high rendering resolution, and these can be printed at an image quality the same as that of the character string 702 and image 703 in FIG. 7 (step S113).

More specifically, with the above-mentioned "output command from GDI 102" (FIG. 8), the image 801 is a 300×300 pixel image and has been rendered at a size of 600×600 pixels with (200,200) as the starting point. Further, the character string "abcdefghijk" is rendered at position (1000,400) at size 200, and the character string "123456789" is output at position (1000,600) at size 200. Furthermore, the image 803 has been rendered upon enlarging a 100×100 image to a size of 1600×1600 from the starting point (200,1000).

Next, control proceeds to step S114, at which the printer driver 103 renders the spool file 104 as a raster image using the GDI rendering engine 107. Here, as mentioned above, the GDI rendering engine 107 is the same module as the GDI 102. Control then proceeds to step S115, at which the printer driver 103 converts the raster image data, which is the result of the conversion, to print data of a printer command and outputs the same to the printer 108. Processing is then terminated.

In accordance with the first embodiment as set forth above, a decline in the quality of a printed image is suppressed. In addition, with regard to data for which printing has been specified by an application, it is possible to reduce the amount of this data spooled.

Second Embodiment

The first embodiment set forth above has been described in regard to a method of rendering the EMF-formatted spool file 104, which has been spooled for the purpose of low-resolution rendering, at a high resolution by the printer driver 103. However, there are instances where printing is performed following halting of spooling itself in the EMF format in accordance with a decision rendered by the application 101. For example, there are cases where a change is made to a RAW spool that spools print command data per se transmitted to the printer 108 by the printer driver 103. In such cases, the first embodiment is such that the "output command from application" (FIG. 8) is output to the printer driver 103 as is via the GDI 102, as a result of which printing happens to be performed at reduced size.

A method of preventing this will now be described.

FIG. 9 is a block diagram illustrating the structure of performing a RAW spool in a printing system according to a second embodiment of the present invention. Components identical with those shown in FIG. 1 are designated by like reference characters and need not be described again.

In the first embodiment, data for which printing is requested by the application 101 is spooled in the spool file 104 by the GDI 102 temporarily as EMF data. By contrast, in the case of RAW spooling according to the second embodiment, the GDI 102 requests the printer driver 103 to perform printing directly. Upon thus being requested to perform printing, the printer driver 103 renders the draw data into raster image data using the GDI rendering engine 107 and then outputs the data upon applying color processing and a printer command. The printer command is then spooled as the spool file 104. The spooled printer command is transmitted to the printer 108 via the print processor 105 and port monitor 106.

Figure 10A:
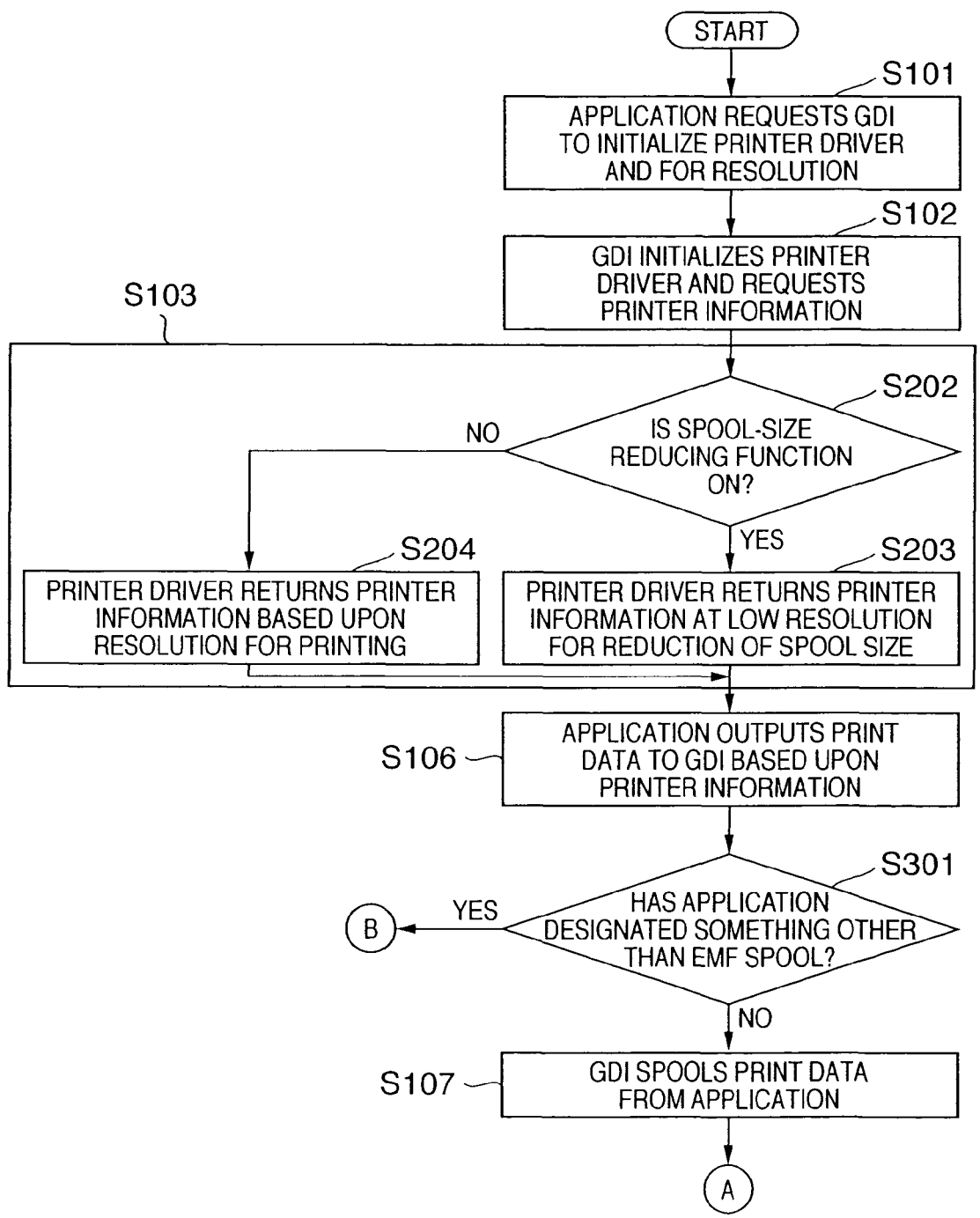
FIG. 10A is a flowchart illustrating an example of the flow of processing in the printing system according to the second embodiment.
Figure 10B:
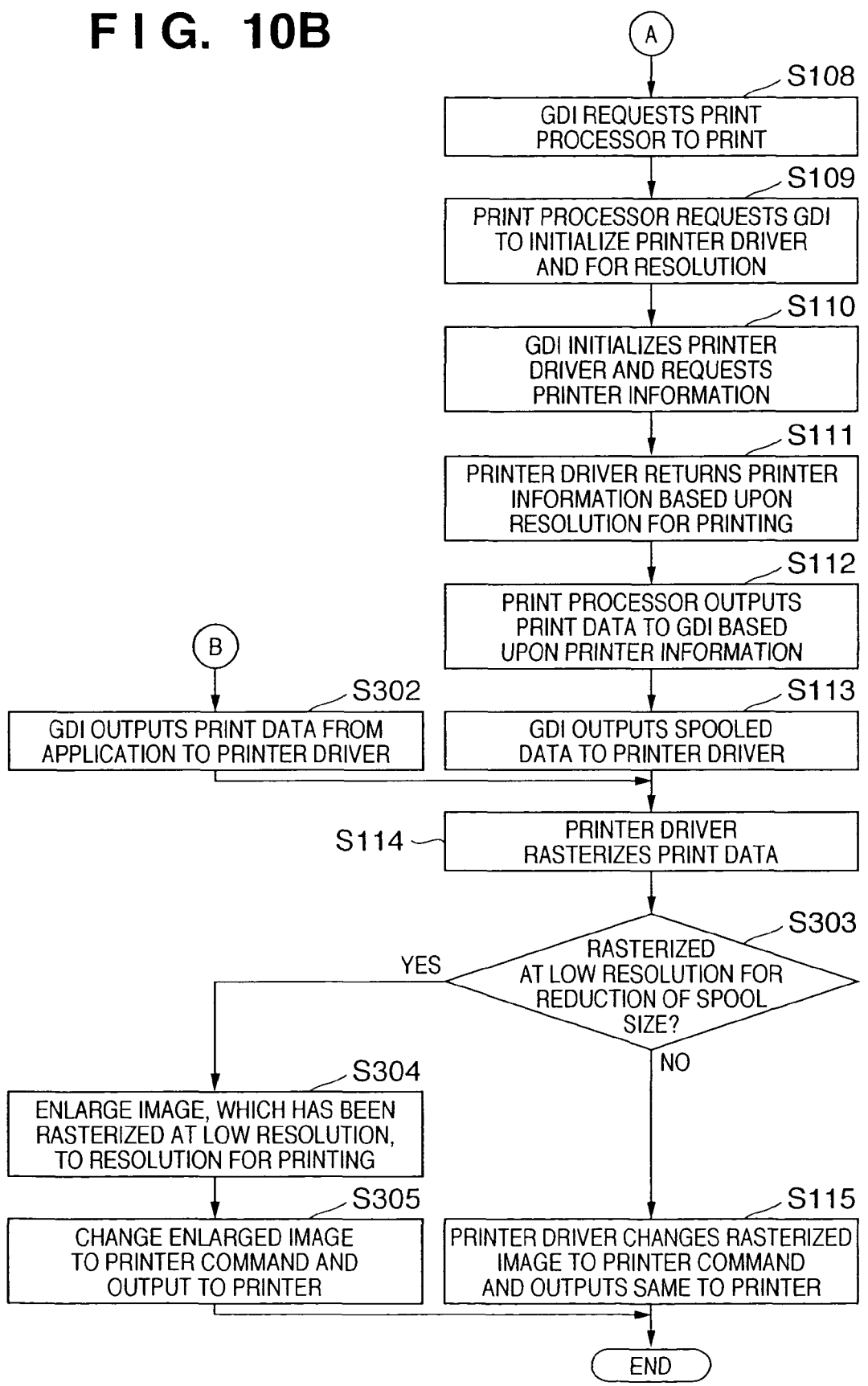
FIG. 10B is a flowchart illustrating an example of the flow of processing in the printing system according to the second embodiment.

Processing according to the second embodiment will be described with reference to the flowcharts of FIGS. 10A, 10B focusing on processing that differs from that of the first embodiment. Steps in FIGS. 10A, 10B identical with those of the flowchart of FIG. 5 are designated by like step numbers and are not described again.

When the application 101 creates draw data and outputs this data to the GDI 102 at step S106 (FIG. 10A), it is possible for the application to inhibit EMF spooling.

Figure 11:
FIG. 11 depicts a diagram illustrating part of the data structure of DOCINFO.

FIG. 11 is a diagram illustrating part of the data structure of "DOCINFO" specified when the application 101 performs initialization.

The data type of the spool file 104 can be specified by "lpszDatatype" 1101 in "DOCINFO". Ordinarily, 0 (referred to as "NULL") is specified and printing is performed with the settings of the system as is. However, EMF spooling is indicated if the character string is "emf", and a changeover to RAW spooling is requested if the character string is "raw".

Thus, at step S301, the GDI 102 determines, based upon "lpszDatatype" 1101 in "DOCINFO", whether the application 101 has designated something other than the EMF spooling. If the decision rendered is "NO", i.e., if EMF spooling is designated, processing from steps S107 to S113 (FIGS. 10A, 10B) is executed.

If a "YES" decision is rendered at step S301 (FIG. 10A), i.e., if something other than EMF spooling is designated, then control proceeds to step S302 (FIG. 10B) and the GDI 102 outputs the draw data from the application 101 directly to the printer driver 103.

Thus, if steps S107 to S113 (FIGS. 10A, 10B) are executed or if the processing of step S302 is executed, control proceeds to step S114 (FIG. 10B) and the printer driver 103 is requested to perform printing via the GDI 102. However, if a "YES" decision is rendered at step S301, then rendering would be performed at a low resolution for the purpose of spool reduction.

Accordingly, in processing from step S303 onward, the low resolution for reducing the spool is raised to the high resolution for printing before an output is delivered to the printer 108, this being done only in a case where rendering has been performed at low resolution. At step S303, therefore, it is determined, based upon the size of the rendered image, etc., whether rendering has been performed at the low resolution for reducing spool size. If a "NO" decision is rendered at step S303, control proceeds to step S115 (FIG. 10B). Since rendering has been performed at the high resolution for printing, the printer driver 103 outputs this raster image data to the printer 108 as is.

If a "YES" decision is rendered at step S303, on the other hand, then control proceeds to step S304. In this case, since rendering has been performed at the low resolution for reducing the size of the spool, the raster image data that has been rasterized at the low resolution is enlarged to the resolution for printing by using an enlarging function possessed by the GDI rendering engine 107. Finally, the enlarged raster image data is converted to a printer command and output to the printer 108 at step S305. This processing is then exited.

Thus, in accordance with the second embodiment as described above, it is possible to render, at high quality, draw data, which is output independently of resolution as in the manner of a character string described by character code, while reducing the size of the output spool file from the application 101, which outputs raster image data that has been rendered at a resolution conforming to the resolution of the printer 108.

Third Embodiment

By virtue of the higher resolution of printers, visual recognition does not suffer even when images are reduced in size. As a result, N-up printing (downscaled layout printing), in which a plurality of pages are reduced in size and printing on a single sheet of paper, has come into wide use. The "N" in N-up represents the number of pages printed on one sheet of paper. For example, in a case where four pages of draw data are printed on a single sheet of paper, such printing is called "4-up".

FIG. 14 is a diagram illustrating an example of 4-up printing in which four pages of draw data have been printed in a 2×2 layout on a single sheet of paper.

In N-up printing, draw data of each of a plurality of pages is reduced and printed. As a consequence, there are cases where fine lines often used in applications for graphs and charts, etc., have their line width reduced to "0" if a size reduction is applied, with the result that these lines are not printed.

FIG. 15 is a diagram illustrating an example in which some fine lines in a table on Page 1 have not been printed in a case where the print data of FIG. 14 is printed.

In the example of FIG. 15, some fine lines have not been printed in draw data of Page 1. Accordingly, the third embodiment will be described in regard to a technique for preventing loss of fine lines at the time of N-up printing. It should be noted that the hardware implementation of the printing system in the third embodiment is similar to that of the first embodiment and need not be described again.

As described in the first embodiment, draw data (print data such as document data and image data) that the application 101 has requested be printed usually is spooled temporarily in the spool file 104 as EMF data by the GDI 102, and the print processor 105 reads in print output information and draw data from the spool file 104 page by page and outputs the same to the printer driver 103 via the GDI 102 one page at a time to print the same.

The GDI 102 has a function for designating an area on part of a sheet of paper per page spooled, reducing one page of data and outputting the reduced data in the corresponding area. Until an instruction for ending output to the sheet of paper is issued to the GDI 102, any number of pages can be output to fit within the same sheet of paper. The print processor 105 performs N-up printing using this function.

More specifically, when the print processor 105 delivers an output to the printer driver 103, the print processor 105 divides the print area, which has been returned by the printer driver 103, into N equal portions, reads in print output information and draw data from the spool file 104 page by page, and outputs the data in order one page at a time to each of the N areas via the GDI 102.

In the third embodiment, the printer driver 103 returns printer information to the application 101. The printer information is based upon a resolution that is the result of multiplying resolution by a reduction ratio taking into consideration the fact that reduction will be carried out. At the time of printing, on the other hand, the printer driver 103 returns high-resolution printer information for printing purposes, whereby lines whose width has been reduced can be printed intact as "1" at the time of printing.

Processing according to the third embodiment will now be described. The hardware implementation of the third embodiment is the same as that of the printing system of first embodiment and need not be described again.

Figure 16:
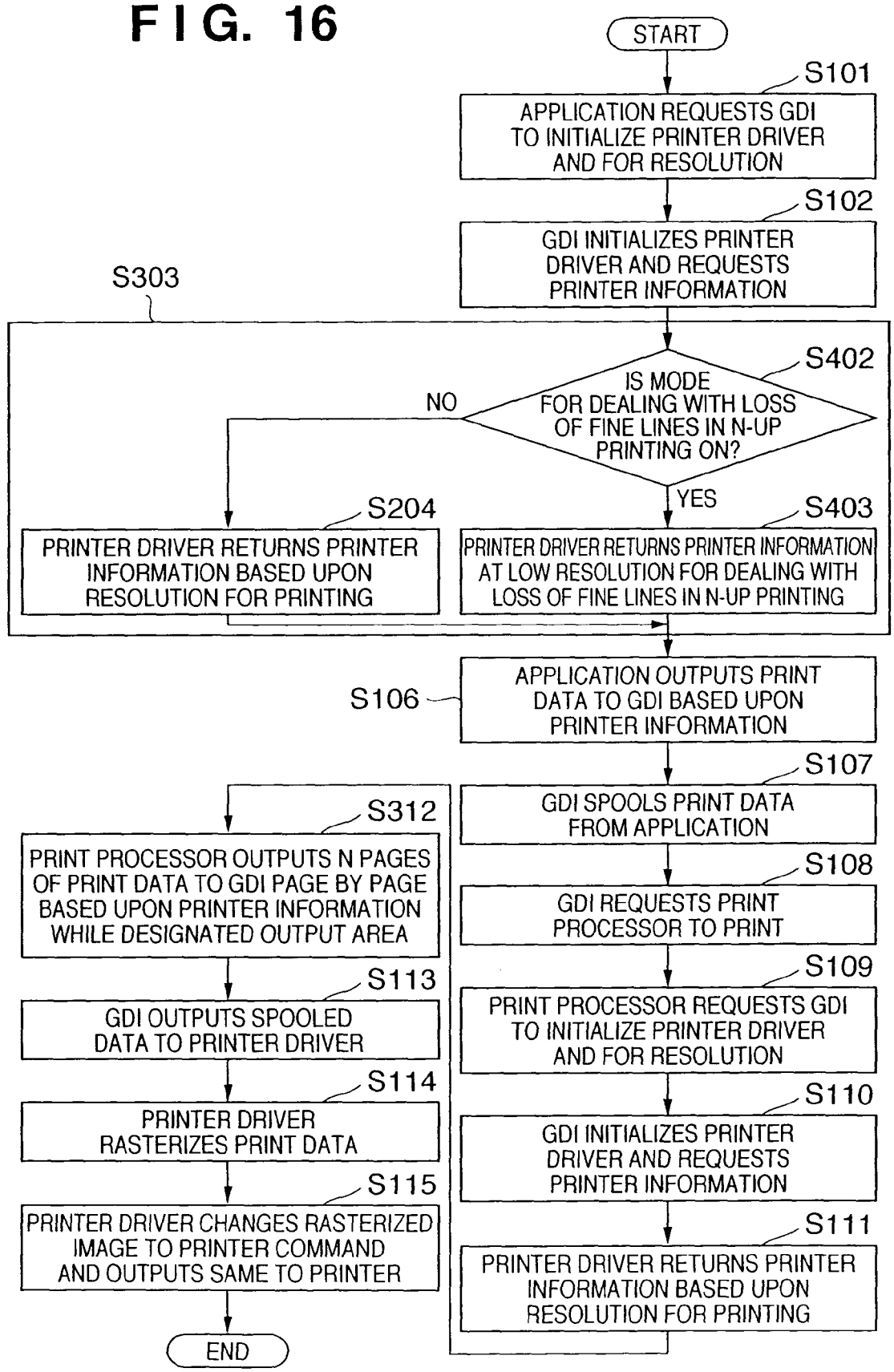
FIG. 16 is a flowchart useful in describing the flow of processing in a printing system according to a third embodiment of the present invention.

FIG. 16 is a flowchart useful in describing the flow of processing in a printing system according to a third embodiment of the present invention. Processing steps identical with those of the flowchart (FIG. 5) of the first embodiment are designated by like step numbers and need not be described again. Here processing for spooling draw data created by the application 101 will be described.

At step S102, the GDI 102 initializes the printer driver 103 and requests printer information referred to as "GDIINFO". Control then proceeds to step S402. If it is determined here based upon the printer information that a mode for dealing with loss of fine lines in N-up printing has been turned on, control proceeds to step S403, at which the printer driver 103 returns a value of low resolution for dealing with loss of fine lines in N-up printing only in case of initialization from the application 101. When the mode for dealing with loss of fine lines in N-up printing is determined to be off, or when initialization is from the print processor 105, the printer driver 103 returns a high rendering resolution (which corresponds to the resolution of the printer 108) at step S204.

Figure 17:
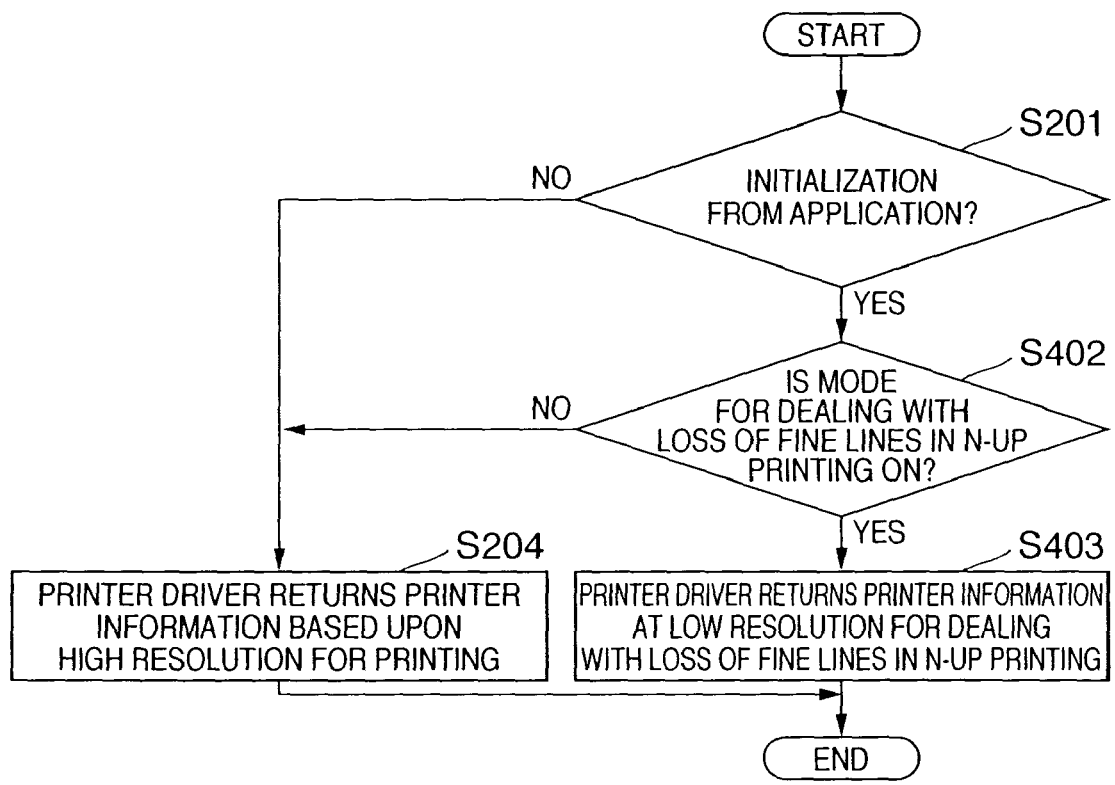
FIG. 17 is a flowchart useful in describing a determination made at a step S303 in FIG. 16 as well as processing based upon this determination.

FIG. 17 is a flowchart illustrating the processing of step S303 in FIG. 16 through which the printer driver 103 determines whether to deal with loss of fine lines in N-up printing and return a resolution that is in accordance with the determination made.

If it is determined at step S201 in FIG. 17 that initialization is from within the application 101, control proceeds to step S402, at which it is determined whether the function for dealing with loss of fine lines in N-up printing is on. This is determined depending upon whether the user has set this function to the ON state using the user interface of FIG. 18. If the result of N-up printing is that some fine lines are missing from the printout, the function for dealing with loss of fine lines in N-up printing is turned on based upon the judgement of the user using the user setting function of the printer driver 103.

Figure 18:
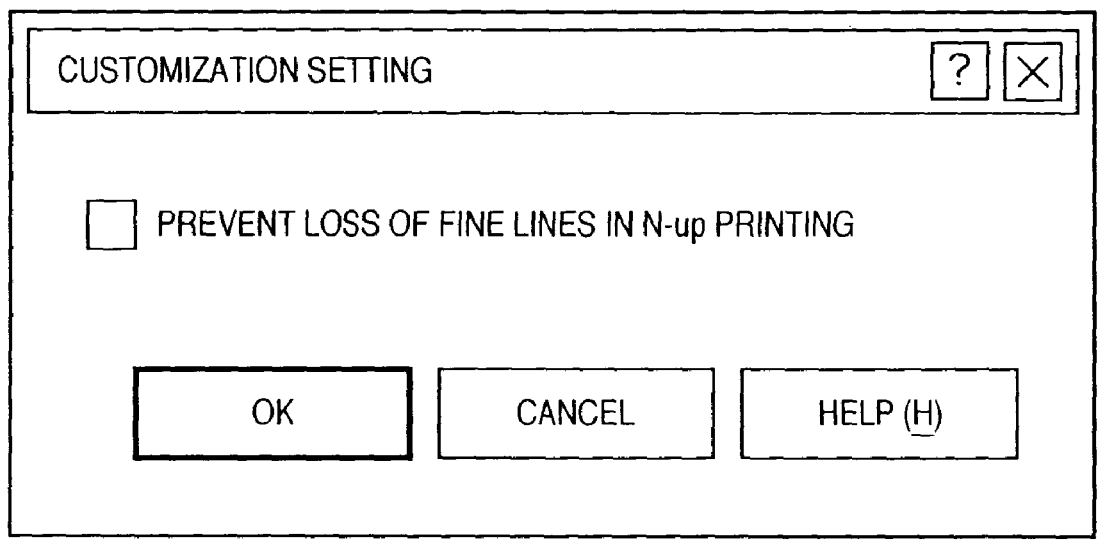
FIG. 18 depicts a diagram illustrating an example of a user interface screen provided by a printer driver for setting a fine-line omission countermeasure function of N-up printing.

FIG. 18 is a diagram illustrating an example of a user interface screen of printer driver 103 for setting the function for dealing with loss of fine lines in N-up printing. Here this function can be set to the ON state by checking a check box labeled "PREVENT LOSS OF FINE LINES IN N-UP PRINTING".

When the user starts printing, the user can set the printer driver 103 from the print setting screen of the application 101. The printer driver 103 stores information as to whether the function for dealing with loss of fine lines in N-up printing is to be set executed or not in "dmDriverData" 401 (FIG. 4) of "DEVMODE" and can make the determination by referring to this information at step S402 in FIG. 17.

If a "NO" decision is rendered at step S201 or S402 (meaning that the function for dealing with loss of fine lines in N-up printing is not to be implemented), control proceeds to step S204, at which the printer driver 103 returns printer information to the GDI 102 based upon a rendering resolution for printing purposes (i.e., based upon the resolution of printer 108).

On the other hand, if a "YES" decision is rendered at both steps S201 and S402 (meaning that the function for dealing with loss of fine lines in N-up printing is to be implemented), control proceeds to step S403, at which the printer driver 103 returns low-resolution printer information, which is for dealing with loss of fine lines in N-up printing, to the application 101 via the GDI 102.

The decision on resolution in this case can be made based upon the N-up reduction ratio. If Nv pages of draw data in the vertical direction and Nh pages of draw data in the horizontal direction are printed on a single sheet of paper (Nv×Nh-up), the reciprocal S of the reduction ratio will be equal to Nh if Nh=Nv holds and Nv if Nh<Nv holds.

However, in order to enhance viewing ease in N-up printing, often blank spaces are inserted between pages or surrounding each page.

Figure 19:
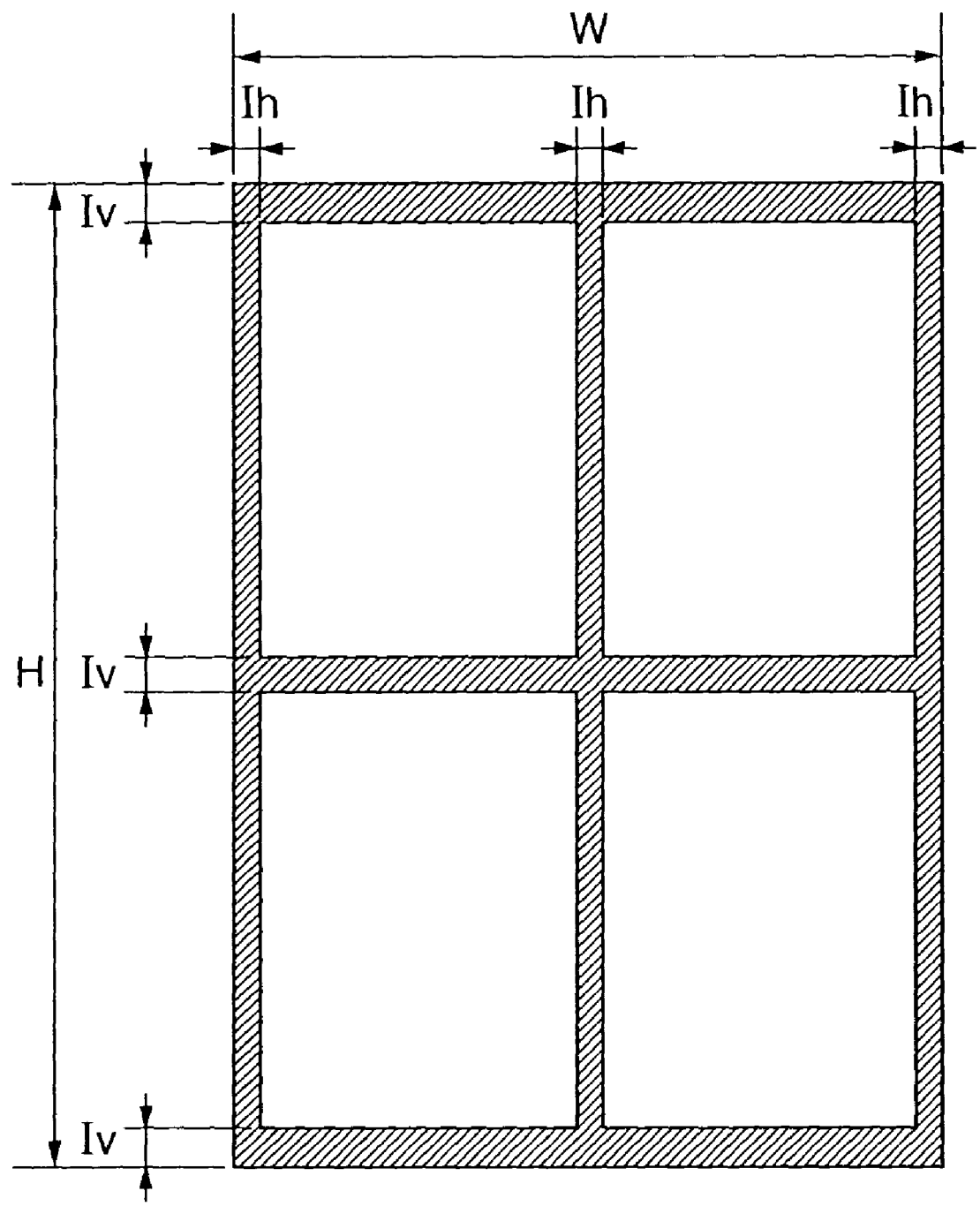
FIG. 19 depicts a diagram useful in describing the manner in which blank spaces are inserted between pages of print data in N-up printing.

FIG. 19 is a diagram useful in describing an example in which blank spaces are inserted between the print images of respective pages. The hatched portions in FIG. 19 indicate the blank spaces. There are a variety of methods of arranging blank spaces. However, since it is preferred that spacing be the same in both the horizontal and vertical directions, an example in which equal spacing is adopted will be described.

Assume now that the width and height of a sheet of paper are W and H, respectively. The length Ih of each blank space in the horizontal direction and the height Iv of each blank space in the vertical direction are not decided until after the magnification/enlargement ratio is decided. Therefore, first the minimum value I of the length of each blank space is decided and then the reduction rate is found based upon this value to thereby make the decision.

Since the image width of each page after reduction can be found from [{W−I×(Nh+1)}÷Nh], the reciprocal Sh of the reduction ratio in the horizontal direction is found as follows:

$$Sh=W \div [\{W-I \times (Nh+1)\} \div Nh]$$

Similarly, the reciprocal Sv of the reduction ratio in the vertical direction is found as follows:

$$Sv=H \div [\{H-I \times (Nv+1)\} \div Nv]$$

Further, S is decided as follows: S=Sh holds in case of Sh=Sv and S=Sv holds in case of Sh<Sv.

As a result of this calculation, there are cases where S will not be an integer.

Processing similar to that of the second embodiment set forth above can be executed in the third embodiment as well. In this case, enlargement is performed after rendering. However, if enlargement is performed at a multiple that is not a whole number, a problem that arises is prolonged processing time. A whole number can be obtained, therefore, by rounding up decimals.

If we let R represent rendering resolution for printing purposes, then resolution for dealing with loss of fine lines in N-up printing will be R/S (S<1). This means that even in the case of a fine line for which printing at a width of one pixel, etc., has been requested, data is spooled as a line for which the line width will not be "0" even after the size reduction.

Processing from step S110 onward in FIG. 16 will now be described.

At step S110, the GDI 102 for which initialization of the printer driver 103 has been requested from the print processor 105 initializes the printer driver 103 and requests the printer driver 103 for "GDIINFO", which is printer information. In response, the printer driver 103 sets "GDIINFO" and performs initialization. At this time the decision of step S201 (FIG. 17) is rendered in a manner similar to that at step S303 because an initialization function the same as that in the case of step S303 is called. Here, since it is determined that initialization is not from within the application 101, the printer driver 103 sets the printer information in "GDIINFO" using the high resolution for printing purposes, which is the resolution of printer 108, and returns this printer information to the GDI 102.

Next, control proceeds to step S312, at which the print processor 105 outputs draw data to the GDI 102 on the basis of this printer information. When N-up printing is carried out, processing for reading the draw data out of the spool file 104 page by page and outputting the data to the printer driver 103 is executed N times. In accordance with the printer information obtained via the GDI 102 page by page, the print processor 105 requests the GDI 102 to specify printing position and to effect a resolution conversion (a change of coordinate space). When the printing of N pages ends, the GDI 102 is notified that writing to the paper has ended.

Control then proceeds to step S113, at which the GDI 102 outputs the N pages of draw data of the spool file 104 to the printer driver 103 as a single sheet of page data in accordance with the instructed printing position and resolution-conversion of the print data of each page requested by the print processor 105. Next, control proceeds to step S114, at which the printer driver 103 renders the spool file 104 into raster image data using the GDI rendering engine 107.

If the application 101 attempts to have the printer 108, whose rendering resolution is 600 dpi, print one inch of a fine line having a width of one pixel in a case where the function for dealing with loss of fine lines in N-up printing is off, a draw command that fills in an area of (0,0) to (1,600) is executed because 600-dpi printer information is returned at step S204. However, in case of, e.g., 4-up printing, printing is performed upon effecting a reduction to an area that is halved both vertically and horizontally by the coordinate transformation of step S312. This means that since a value of less than one pixel is discarded, a transformation is made such that an area of (0,0) to (0,300), namely an area of width "0", is filled in. As a result, the GDI 102 executes the next draw command without outputting a draw command to the printer driver 103, and therefore the fine line is no longer printed. However, since a draw command for filling in an area of (1,0) to (2,600) undergoes a conversion such that an area of (0,0) to (1,300) is printed even though the area is reduced to one half, printing is carried out at a width of one pixel. In other words, printing is or is not performed depending upon position.

On the other hand, if an attempt is made to print one inch of a fine line having a width of one pixel in a case where the function for dealing with loss of fine lines in N-up printing is on, then the printer driver 103 will return printer information of resolution 300 dpi at step S403 in case of 4-up printing. The application 101 therefore executes a draw command that fills in an area of (0,0) to (1,300). However, when printing is actually carried out, the printer driver 103 returns printer information of resolution 600 dpi at step S204. As a result, as described above in connection with the first embodiment, a function according to which the print processor 105 subjects the spooled draw data to a coordinate transformation in conformity with the resolution of the printer driver 103 and then outputs the result operates, and a conversion is made to a draw command that fills in an area of (0,0) to (2,600). As a result, even though printing is performed upon making a size reduction to half in 4-up printing, 0.5 inches of a fine line having a width of one pixel is printed by a (0,0) to (1,300) draw command.

Control then proceeds to step S115, at which the rendered raster image data is converted to a printer command and output to the printer 108. Processing is then exited.

Thus, in accordance with the third embodiment of the present invention as set forth above, even though print data of each of a number of pages is reduced in size and printed in N-up printing, it is possible to avoid a situation in which fine lines employed in applications for graphs and charts, etc., are reduced to width "0". In other words, the problem in which fine lines fail to be printed can be avoided.

Other Embodiments

It goes without saying that the object of the invention is attained by supplying a storage medium storing the program codes of the software for performing the functions of the foregoing embodiments to a system or an apparatus, reading the program codes with a computer (e.g., a CPU or MPU) of the system or apparatus from the storage medium, and then executing the program codes. In this case, the program codes read from the storage medium implement the novel functions of the embodiments and the storage medium storing the program codes constitutes the invention. Examples of storage media that can be used for supplying the program code are a floppy disk, hard disk, optical disk, magneto-optical disk, CD-ROM, CD-R, magnetic tape, non-volatile type memory card or ROM, etc.

Furthermore, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiments.

It goes without saying that the present invention further covers a case where, after the program codes read from the storage medium are written in a function expansion board inserted into the computer or in a memory provided in a function expansion unit connected to the computer, a CPU or the like contained in the function expansion board or function expansion unit performs a part of or the entire process in accordance with the designation of program codes and implements the function of the above embodiment.

The present invention is not limited to the above embodiments and various changes and modification can be made within the spirit and scope of the present invention. Therefore, to apprise the public of the scope of the present invention, the following claims are made.

What is claimed is:

1. An information processing apparatus which has a printer driver for converting draw data generated by an application program into a printer command, the apparatus comprising:
a designation unit configured to designate a predetermined print function in accordance with an instruction of a user input by using the printer driver; and
a sending unit configured to send a first resolution which is lower than a second resolution to the application program in a case where the predetermined print function is designated, or to send the second resolution to the application program in a case where the predetermined print function is not designated;

wherein first draw data generated by the application program in accordance with the first resolution is processed in the second resolution after the application program generates the first draw data in accordance with the first resolution sent by the sending unit, wherein second draw data generated by the application program in accordance with the second resolution is processed in the second resolution after the application program generates the second draw data in accordance with the second resolution sent by the sending unit, wherein the first draw data generated by the application program in accordance with the first resolution is processed in the second resolution so as to output a first print image, and the size of the first print image is the same as the size of a second print image which is output by processing the second draw data in the second resolution which is generated by the application program in accordance with the second resolution.

2. An information processing method in an information processing apparatus has a printer driver for converting draw data generated by an application program into a printer command the method comprising:

a designation step of designating a predetermined print function in accordance with an instruction of a user input by using the printer driver; and a sending step of sending a first resolution which is lower than a second resolution to the application program in a case where the predetermined print function is designated, or sending the second resolution to the application program in a case that the predetermined print function is not designated;

wherein first draw data generated by the application program in accordance with the first resolution is processed in the second resolution after the application program generates the first draw data in accordance with the first resolution sent by the sending unit, wherein second draw data generated by the application program in accordance with the second resolution is processed in the second resolution after the application program generates the second draw data in accordance with the second resolution sent by the sending unit, wherein the first draw data generated by the application program in accordance with the first resolution is processed in the second resolution so as to output a first print image, and the size of the first print image is the same as the size of a second print image which is output by processing the second draw data in the second resolution which is generated by the application program in accordance with the second resolution.

3. A non-transitory computer-readable medium for storing a program for causing a computer to implement a printing control program for converting draw data which has been generated by an application program into a printer command, the printing control program having:

a designation step of designating a predetermined print function in accordance with an instruction of a user; and a sending step of sending, a first resolution which is lower than a second resolution to the application program in a case where the predetermined print function is designated, or sending the second resolution to the application program in a case where the predetermined print function is not designated; and wherein first draw data generated by the application program in accordance with the first resolution is processed in the second resolution after the application program generates the first draw data in accordance with the first resolution sent by the sending unit, wherein second draw data generated by the application program in accordance with the second resolution is processed in the second resolution after the application program generates the second draw data in accordance with the second resolution sent by the sending unit, wherein the first draw data generated by the application program in accordance with the first resolution is processed in the second resolution so as to output a first print image, and the size of the first print image is the same as the size of a second print image which is output by processing the second draw data in the second resolution which is generated by the application program in accordance with the second resolution.

4. The apparatus according to claim 1, further comprising an operating system performing spool processing for spooling draw data generated by the application program.

5. The apparatus according to claim 4, wherein the predetermined print function is a function to reduce an amount of the draw data spooled in the spool processing.

6. The apparatus according to claim 1, wherein the draw data generated by the application program is rasterized in the information processing apparatus.

7. The method according to claim 2, wherein the information processing apparatus comprises an operating system performing spool processing for spooling draw data generated by the application program.

8. The method according to claim 7, wherein the predetermined print function is a function to reduce an amount of the draw data spooled in the spool processing.

9. The method according to claim 2, wherein the draw data generated by the application program is rasterized in the information processing apparatus.

10. The computer-readable medium according to claim 3, wherein the computer comprises an operating system performing spool processing for spooling draw data generated by the application program.

11. The computer-readable medium according to claim 10, wherein the predetermined print function is a function to reduce an amount of the draw data spooled in the spool processing.

12. The computer-readable medium according to claim 3, wherein the draw data generated by the application program is rasterized in an information processing apparatus.

* * * * *